United States Patent
Sharifi et al.

(10) Patent No.: US 9,224,385 B1
(45) Date of Patent: Dec. 29, 2015

(54) UNIFIED RECOGNITION OF SPEECH AND MUSIC

(71) Applicant: Google Inc., Mt. View, CA (US)

(72) Inventors: Matthew Sharifi, Santa Clara, CA (US); Ben Shahshahani, Menlo Park, CA (US); Dominik Roblek, Ruschlikon (CH)

(73) Assignee: GOOGLE INC., Mountain View, CA (US)

(*) Notice: Subject to any disclaimer, the term of this patent is extended or adjusted under 35 U.S.C. 154(b) by 90 days.

(21) Appl. No.: 13/919,170

(22) Filed: Jun. 17, 2013

(51) Int. Cl.
*G10L 15/00* (2013.01)
*G10L 15/04* (2013.01)

(52) U.S. Cl.
CPC ..................................... *G10L 15/04* (2013.01)

(58) Field of Classification Search
CPC ............... G10H 2220/011; G10H 2210/086; G10H 2210/031; G10H 2210/051; G10H 2210/061; G01L 25/78; G01L 15/08; G01L 25/93; G01L 25/00; G01L 19/00; G01L 19/22; G01L 25/81; G06F 17/30743; G06F 17/2785; G06F 17/279; G06F 17/30654; G06F 17/30699; G06F 17/273; G06F 17/30758; G06F 17/30017; G06F 17/30575; G06F 17/30749; G06F 17/275; G06F 17/30029; G06F 17/30787; G06F 17/30796; G06F 17/3084

USPC .............. 704/236, 231, 255, 257, 270, 270.1, 704/1–10, 251, 272, 208, 210, 214, 215; 700/94; 709/238

See application file for complete search history.

(56) References Cited

U.S. PATENT DOCUMENTS

| | | | |
|---|---|---|---|
| 6,633,846 B1 * | 10/2003 | Bennett et al. | 704/257 |
| 8,892,231 B2 * | 11/2014 | Cheng et al. | 700/94 |
| 2010/0211693 A1 * | 8/2010 | Master et al. | 709/238 |

* cited by examiner

*Primary Examiner* — Huyen Vo
(74) *Attorney, Agent, or Firm* — Morris & Kamlay LLP

(57) ABSTRACT

Methods, systems, and computer programs are presented for unified recognition of speech and music. One method includes an operation for starting an audio recognition mode by a computing device while receiving an audio stream. Segments of the audio stream are analyzed as the audio stream is received, where the analysis includes simultaneous checking for speech and music. Further, the method includes an operation for determining a first confidence score for speech and a second confidence score for music. As the audio stream is received, additional segments are analyzed until the end of the audio stream or until the first and second confidence scores indicate that the audio stream has been identified as speech or music. Further, results are presented on a display based on the identification of the audio stream, including text entered if the audio stream was speech or song information if the audio stream was music.

20 Claims, 7 Drawing Sheets

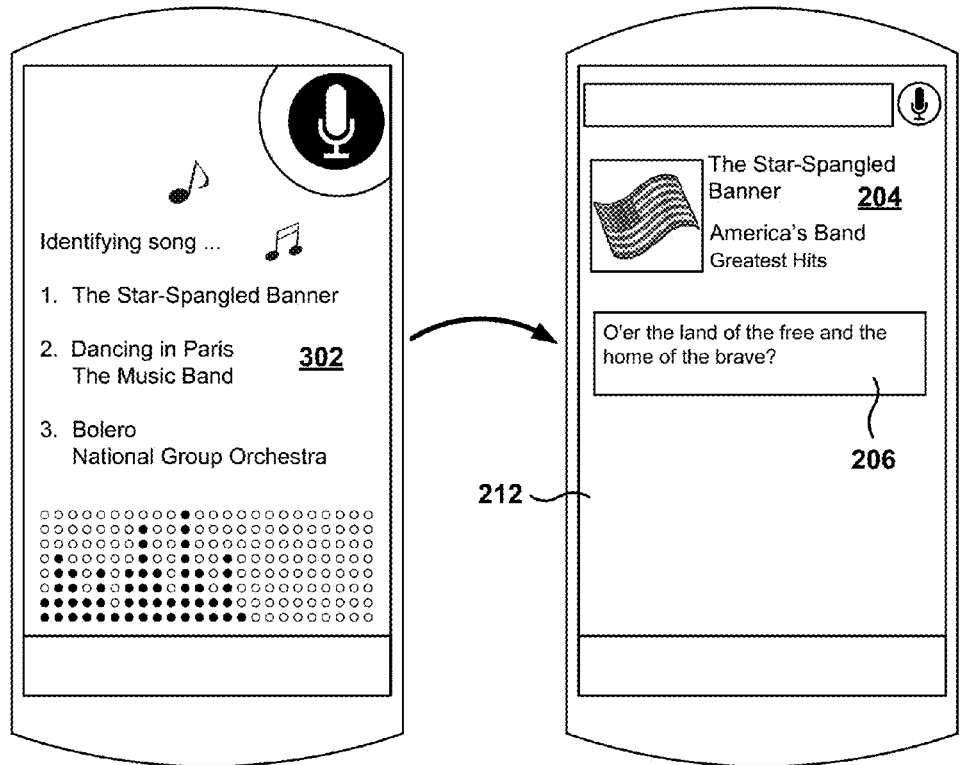
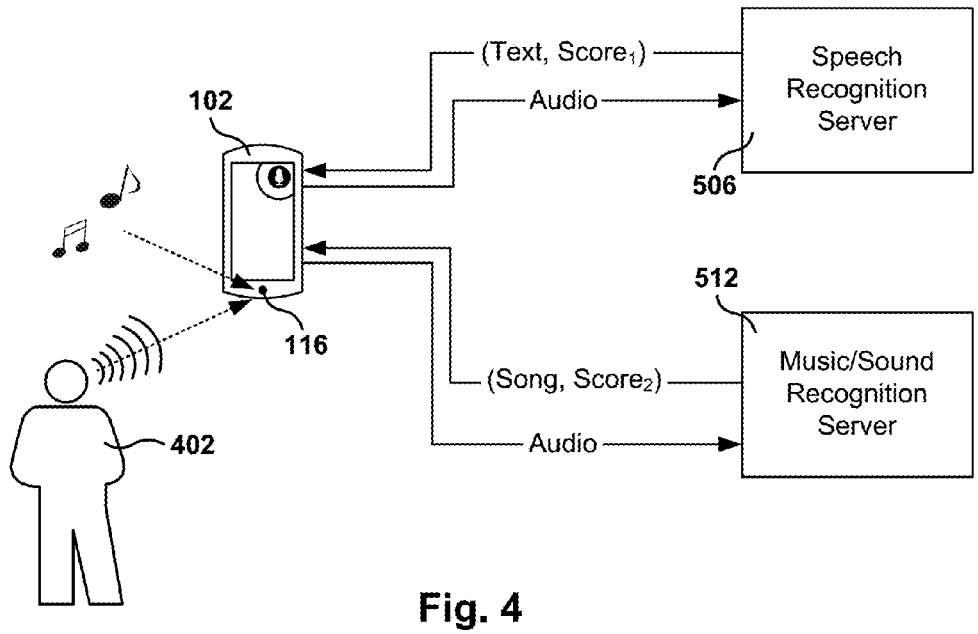
Fig. 3
Fig. 4

UNIFIED RECOGNITION OF SPEECH AND MUSIC

BACKGROUND

1. Field

The present embodiments relate to methods, systems, and computer programs for detecting audio content, and more particularly, methods, systems, and computer programs for detecting speech and music.

2. Description of the Related Art

As computing devices become more powerful, the number of applications supported by these computing devices continues growing rapidly. Additionally, new input modes are continuously being created to make entering requests for the computer device easier for the user.

Speech recognition has grown in popularity, especially for handheld devices that do not have a keyboard. Speech recognition allows quick entry of word parameters for performing operations in the computing device. Speech recognition may be used for performing Internet searches, setting up alarms, entering text for a text message, performing a web search, making a phone call, etc. Some computing devices also provide music recognition of music entered via microphone. Music recognition provides information regarding song title, author, album, etc.

Although speech recognition and music recognition may be provided by some devices, the programs and interfaces are different, requiring the user to enter different commands before accessing either one of the recognition modes.

What is needed is an easy interface that may be used for speech recognition and music recognition.

It is in this context that embodiments arise.

SUMMARY

Methods, devices, systems, and computer programs are presented for unified recognition of speech and music. It should be appreciated that the present embodiments can be implemented in numerous ways, such as a method, an apparatus, a system, a device, or a computer program on a computer readable medium. Several embodiments are described below.

In one embodiment, a method for providing information to a user is provided. The method includes an operation for detecting entry in an audio recognition mode by a computing device, the detecting including receiving an audio stream. One or more segments of the audio stream received are analyzed by the computing device before a complete audio stream is received, wherein the analysis includes first checking the one or more segments to determine if the audio stream includes speech, and second checking the one or more segments to determine if the audio stream is from a song. At least part of the first checking is performed while the second checking is being performed. Further, the method includes an operation for determining a first confidence score from the first checking and determining a second confidence score from the second checking. The method includes another operation for continuously checking additional segments as the audio stream is received until an end of the audio stream or until the first and second confidence scores determine that the audio stream has been identified as speech or music. Results are presented on a display based on the identification of the audio stream. In one embodiment, the operations of the method are executed by a processor.

In another embodiment, a device for providing information to a user is presented. The device includes a microphone, a display, a processor, and a memory. The memory includes a computer program for audio recognition, where instructions of the computer program when executed by the processor perform a plurality of operations. An operation is included for detecting entry in an audio recognition mode, the detecting including receiving an audio stream via the microphone. Additionally, one or more segments of the audio stream are analyzed before a complete audio stream is received. The analysis includes sending the one or more segments to a first server for determining if the audio stream includes speech, and sending the one or more segments to a second server for determining if the audio stream is from a song. A first confidence score is received from the first server and a second confidence score is received from the second server. Another operation is provided for continuously analyzing additional segments as the audio stream is received until the end of the audio stream, or until the first and second confidence scores determine that the audio stream has been identified as speech or music. Results are presented on the display based on the identification of the audio stream.

In yet another embodiment, a computer program embedded in a non-transitory computer-readable storage medium, when executed by one or more processors, for providing information to a user is presented. The computer program includes program instructions for detecting entry in an audio recognition mode by a computing device, the detecting including receiving an audio stream. The computer program also includes program instructions for analyzing one or more segments of the audio stream received by the computing device before a complete audio stream is received, wherein the analysis includes a first check of the one or more segments to determine if the audio stream includes speech, and a second check of the one or more segments to determine if the audio stream is from a song. At least part of the first checking is performed while the second checking is being performed. The computer program further includes program instructions for determining a first confidence score from the first checking and determining a second confidence score from the second checking, and program instructions for continuing checking additional segments as the audio stream is received until an end of the audio stream or until the first and second confidence scores determine that the audio stream has been identified as speech or music. Further yet, the computer program includes program instructions for presenting results on a display based on the identification of the audio stream.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

FIG. 3 is an audio recognition interface that provides intermediate results, according to several embodiments.

FIG. 4 illustrates a method for simultaneous detection of speech and music, according to several embodiments.

DETAILED DESCRIPTION

The following embodiments describe methods, systems, and computer programs for unified recognition of speech and music. It will be apparent, that the present embodiments may be practiced without some or all of these specific details. In other instances, well known process operations have not been described in detail in order not to unnecessarily obscure the present embodiments.

Figure 1:
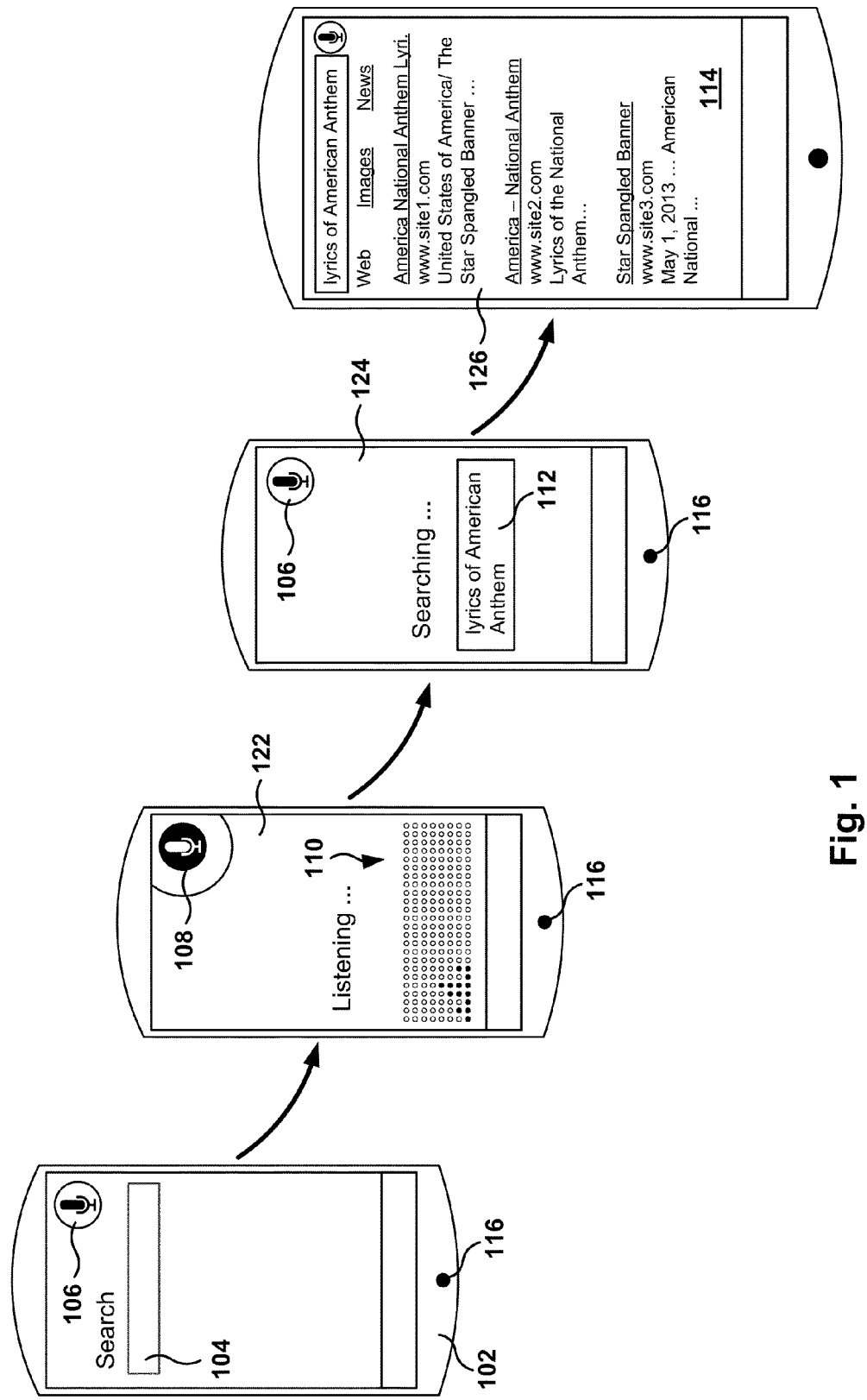
FIG. 1 is an audio recognition interface for determining the content of an audio stream, according to several embodiments.

FIG. 1 is an audio recognition interface for determining the content of an audio stream, according to several embodiments. Embodiments described herein present a microphone button 106, which is a multifunctional button that provides a plurality of audio recognition functions.

It is noted that the embodiments described herein utilize a handheld device as the computing device for implementing the multifunctional microphone button. However, other embodiments may utilize different devices, such as a smart phone, a mobile phone, a tablet, a laptop, a PC, etc. Further, the multifunctional microphone button functionality is described with reference to a button activated by touch on a touch sensitive screen, but other embodiments may utilize different inputs to activate the multifunctional microphone functions, such as a key on a keyboard, a user gesture, a button on a controller, a mouse click, etc. The embodiments described herein should therefore not be interpreted to be exclusive or limiting, but rather illustrative.

Embodiments presented provide a consistent interface that may be used for both speech and for other types of sound recognition. Some embodiments describe implementations for music recognition, i.e., identifying a song, but other types of audio recognition may be utilized using the same principles, such as recognizing a movie soundtrack, recognizing a TV show, recognizing a famous speech or quote, etc.

The described interfaces provide a unified solution that is consistent for speech and music recognition. The unified interface provides a single input to initiate speech recognition or music recognition. In addition, the ways in which results are displayed are also consistently similar when detecting speech or music.

Returning to FIG. 1, the portable device 102 includes a search interface that includes the possibility of entering text in entry box 104 or pressing on microphone button 106 to initiate audio recognition. FIG. 1 illustrates a sequence showing how the user interface changes when the user selects audio recognition.

In the embodiment of FIG. 1, when the user selects microphone button 106, audio recognition is started (see interface 122). In the embodiment of interface 122 the microphone button changes appearance and shows an indicator 108 that audio is being captured by microphone 116.

In some embodiments, interface 122 includes an indicator 110 to let the user know that recognition is taking place (besides the microphone icon changing form). The indicator that audio recognition takes place may be of different kinds, such as text on the screen (e.g., "Listening"), a changing graphic (e.g., dots filling up in a progress chart), a changing icon (e.g., an hourglass), etc. In some embodiments, an additional indicator is shown on the display besides the changing icon for the microphone button 108. In the embodiment of FIG. 1, indicator 110 displays microphone volume levels of audio being captured.

In one embodiment, if speech is being entered, intermediate results (e.g., before all the speech has been received and analyzed) are shown. The intermediate results (not shown in FIG. 1) may include the words that have been already recognized.

In one embodiment, the speech interface 124 is for performing a web search. Therefore, after the speech recognition phase is completed, a search is started utilizing the captured text. A text message 112 (e.g., "lyrics of American Anthem") is displayed showing the text that was interpreted by the device. The appearance of microphone button 106 reverts to the original displayed icon in interface 124, to notify the user that the speech recognition phase has ended. After the search is performed, interface 126 shows the search results 114 in the display of portable device 102.

Figure 2:
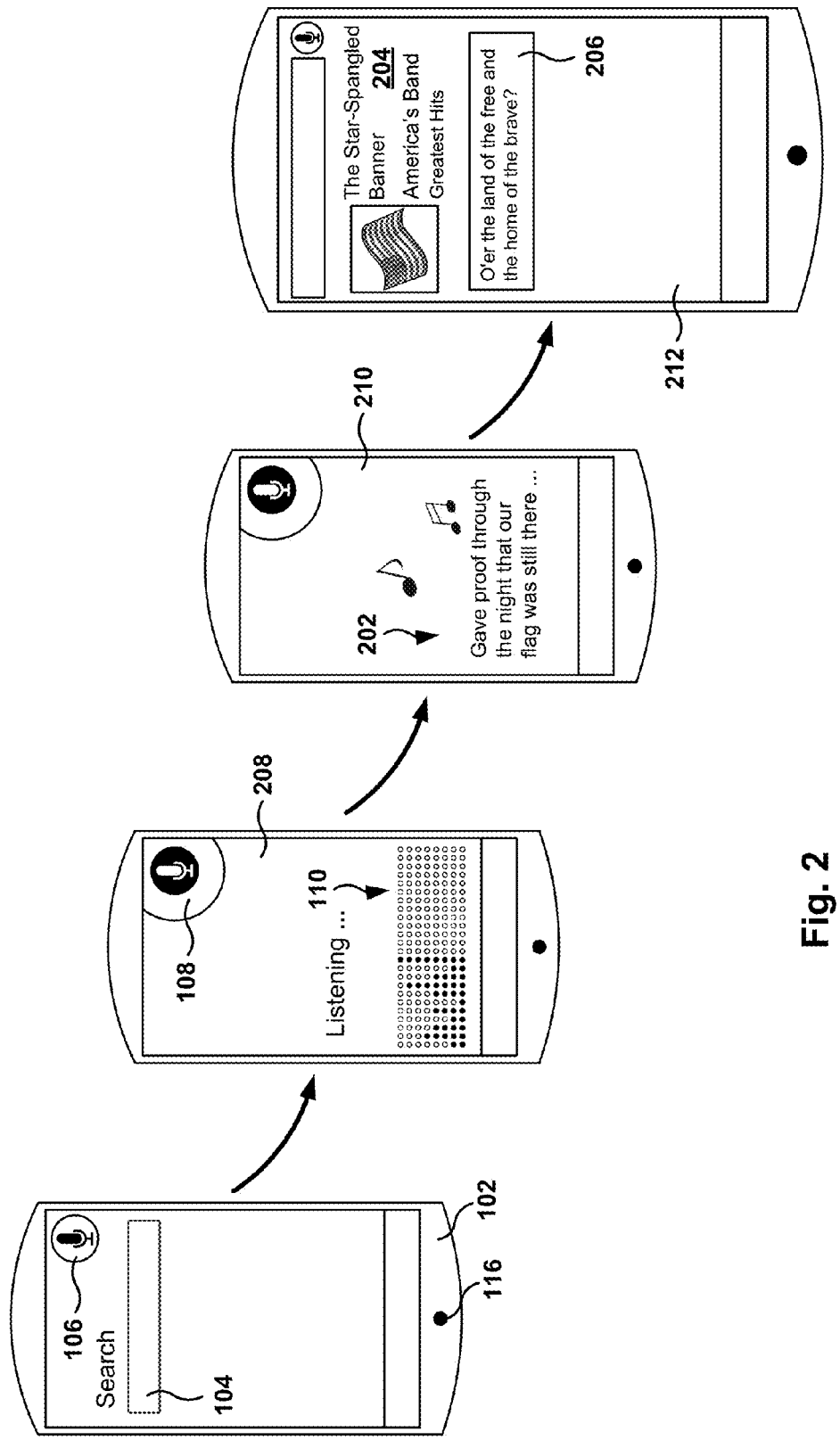
FIG. 2 is the audio recognition interface of FIG. 1 when providing a music segment for song recognition, according to several embodiments.

FIG. 2 is the audio recognition interface of FIG. 1 when providing a music segment for song recognition, according to several embodiments. Providing a unified interface for speech and music recognition is challenging because the methodologies for recognizing speech and recognizing music are different. In addition, the results are also different. For example, a text string versus a song title (and potentially other information related to the song). In addition, the operation performed after detecting speech may be different from the operation performed after detecting a song. In some embodiments, the captured speech is used to perform a search while the identified song is used to provide song information together with song lyrics.

Initially, the interface for detecting speech and music is the same. After the user selects microphone button 106, interface 208 shows that the device is capturing audio (e.g., listening). The microphone button 108 changes and indicator 110 shows that the device is capturing sound.

After the device determines that the audio being captured corresponds to music, interface 210 displays the lyrics 202 associated with the audio segment previously captured by the device. This way, the device indicates that the audio has been identified as music. Afterwards, interface 212 shows on the display information 204 about the song (e.g., title, artist, album, date released, duration, etc.). Interface 210, which indicates that the song has been identified, is displayed for a predetermined amount of time, to show the user that the song has been identified, before moving to interface 212 and display the song information. The predetermined amount of time may be in the range of 0.5 seconds to 5 seconds, or some other value. In one embodiment, interface 202 is displayed for one second.

In one embodiment, interface 212 starts displaying the lyrics together with the song. This means, that the audio is synchronized with the music captured by the device 102. In one embodiment, the portable device keeps listening to the audio to guarantee that the lyrics are synchronized, but in other embodiments the device assumes that the identified song keeps playing, and the lyrics are presented with the song. Since information about the song is obtained by portable device 102, it is possible to know the timing of the song. Therefore, the lyrics are played together with the song, without having to listen and analyze the music any further, and without having to query the server again. The server provided time-stamped lyrics from the time at which the match was made and timing information for the song, enabling the client to continue displaying the lyrics from that point on.

It is noted, that the interface for FIGS. 1 and 2 correspond to a unified audio recognition interface, where after pressing the microphone button, the portable device captures the audio and determines if speech or music is being captured. Therefore, it is not needed to have separate interfaces for recognizing speech and music. The user does not need to inform the device that speech or music is being recognized, and the device will make the determination of which is the mode that is being activated.

A consistent unified interface is provided, where speech is translated to text, and music is similarly translated to lyrics. The text or lyrics are shown on the display to validate that the device has recognized the audio being captured. Afterwards, the results are displayed, and in some embodiments additional operations are performed, such as performing a search for text or displaying lyrics together with the music.

FIG. 3 is an audio recognition interface that provides intermediate results, according to several embodiments. In some embodiments, after detecting that the audio received is music, a list of partial results 302 is shown temporarily until the real song is determined. For example, the system may detect within a second or two that music is being captured, but the fingerprint of the audio being captured is still not unique due to the short amount of song time available. The system displays briefly two or more possible candidates, and when the final determination is made, the system displays song information 212, or the lyrics of the piece captured, as shown in interface 210 of FIG. 2.

In one embodiment, the portable device sends compressed audio to the server, and the server sends back a stream of updates with information about what are the best matches so far. There is a two-way streaming communication between client and server, which includes periodic updates in both directions: the audio being captured in one direction, and information identified so far about the audio in the opposite direction.

It is noted that the embodiments illustrated in FIGS. 1-3 are examples. Other embodiments may utilize different interfaces, different display of intermediate and final results, different microphone options, etc. The embodiments illustrated in FIGS. 1-3 should therefore not be interpreted to be exclusive or limiting, but rather illustrative.

FIG. 4 illustrates a method for simultaneous detection of speech and music, according to several embodiments. As soon as the portable device starts capturing audio, the portable device establishes streaming communications with speech recognition server 506 and music/sound recognition server 512. The portable device 102, also referred to herein as the client, streams the audio to both servers soon after starting capturing audio. This means, that the client does not wait for the whole audio to be captured before transmitting the audio to the servers. For example, the client may start sending audio to the servers as soon as half a second or one second after activating the microphone button, but other initial waiting periods are also possible.

Speech recognition server 506 analyzes the received audio and returns a stream of partial results until the final result is sent to the client. Each of the results includes, at least, text recognized so far (if any) and a confidence score $S_1$ providing a measurement of how confident the speech recognition server is that the audio received is for speech. In one embodiment, the higher the confidence level that the audio is speech, the higher the score $S_1$ is.

Under most circumstances, if the audio captured is for speech, the confidence scores returned by the speech server will gradually increase, as more audio is available to analyze the speech received. The more information is available, the easier it is to analyze the received sound.

Similarly, the audio is sent by the client to the music recognition server 512, and the music recognition server returns information to the client regarding music recognized so far (if any) and a music recognition confidence score $S_2$ indicative of the probability that the audio captured corresponds to music.

In one embodiment, the music recognition server 512 computes a fingerprint of the audio received so far from the client. An acoustic fingerprint is a condensed digital summary, deterministically generated from an audio signal, which can be used to identify an audio sample or quickly locate similar items in an audio database. Some of the practical uses of acoustic fingerprinting include identifying songs, melodies, tunes, advertisements, videos, movies, etc.

In some implementations, acoustic fingerprints are analogous to human fingerprints where small variations that are insignificant to the features the fingerprint uses are tolerated. For example, a smeared human fingerprint impression can accurately be matched to a fingerprint sample in a reference database even though the fingerprint is not perfect.

Perceptual characteristics often exploited by audio fingerprints include average zero crossing rate, estimated tempo, average spectrum, spectral flatness, prominent tones across a set of bands, and bandwidth. Additionally, many audio compression techniques make radical changes to the binary encoding of an audio file, without radically affecting the way it is perceived by the human ear. A robust acoustic fingerprint allows a recording to be identified after the recording has gone through such compression, even if the audio quality has been reduced.

After music recognition server 512 creates a fingerprint for the received audio, the fingerprint is looked up in the database of known songs to find a matching reference song. Of course, the audio received by the server may be different from the captured audio due to possible changes due to compression and transmission of the audio. However, a good fingerprint algorithm will still be able to identify the correct song even in the presence of noise or slight alterations to the audio.

If the music recognition server 512 identifies the song, the music server sends song information to the client, including song identification and the matching timestamp within that particular song where the audio was captured. Once the client receives this information, the client is able to display the lyrics of the song, if so desired. In one embodiment, the music recognition server 512 sends lyrics data to the client, and in another embodiment, the client 102 fetches the lyrics once the client has the song information. Fingerprinting can be started soon as after half a second of audio, maybe sooner, and typically a certain match may be made after 2 or 3 seconds of music are available, but it may take up to 10 seconds or more if the quality of the audio is low (e.g., noisy environment).

In some embodiments, there are two confidence thresholds. A first threshold determines if partial results are to be displayed, and a second threshold determines if final results are available. The thresholds may be adjusted by the system based on accumulated data regarding the quality of audio recognition.

Therefore, as long as the confidence level is below the first threshold, partial results will not be displayed, and after the confidence level is above the first threshold then partial results will be displayed, as long as the interface is defined to provide intermediate results. Similarly, final results will not be displayed as long as the confidence score is below the second threshold, and final results will be displayed after the confidence score is above the second threshold.

With regards to speech recognition, it may take 5 to 10 seconds to make the match, or even longer, depending on the amount of speech being entered by the user. In some embodiments, partial results are displayed. The partial results may include the words recognized up to that moment, but as more information (e.g., audio) is available the intermediate results may change (e.g., some of the words being displayed may change). For example, if a strange combination (e.g., improbable combination) of two words is received, the speech recognition server may use its lexicon analysis capabilities to modify one of the words to form a more natural word combination.

Figure 5:
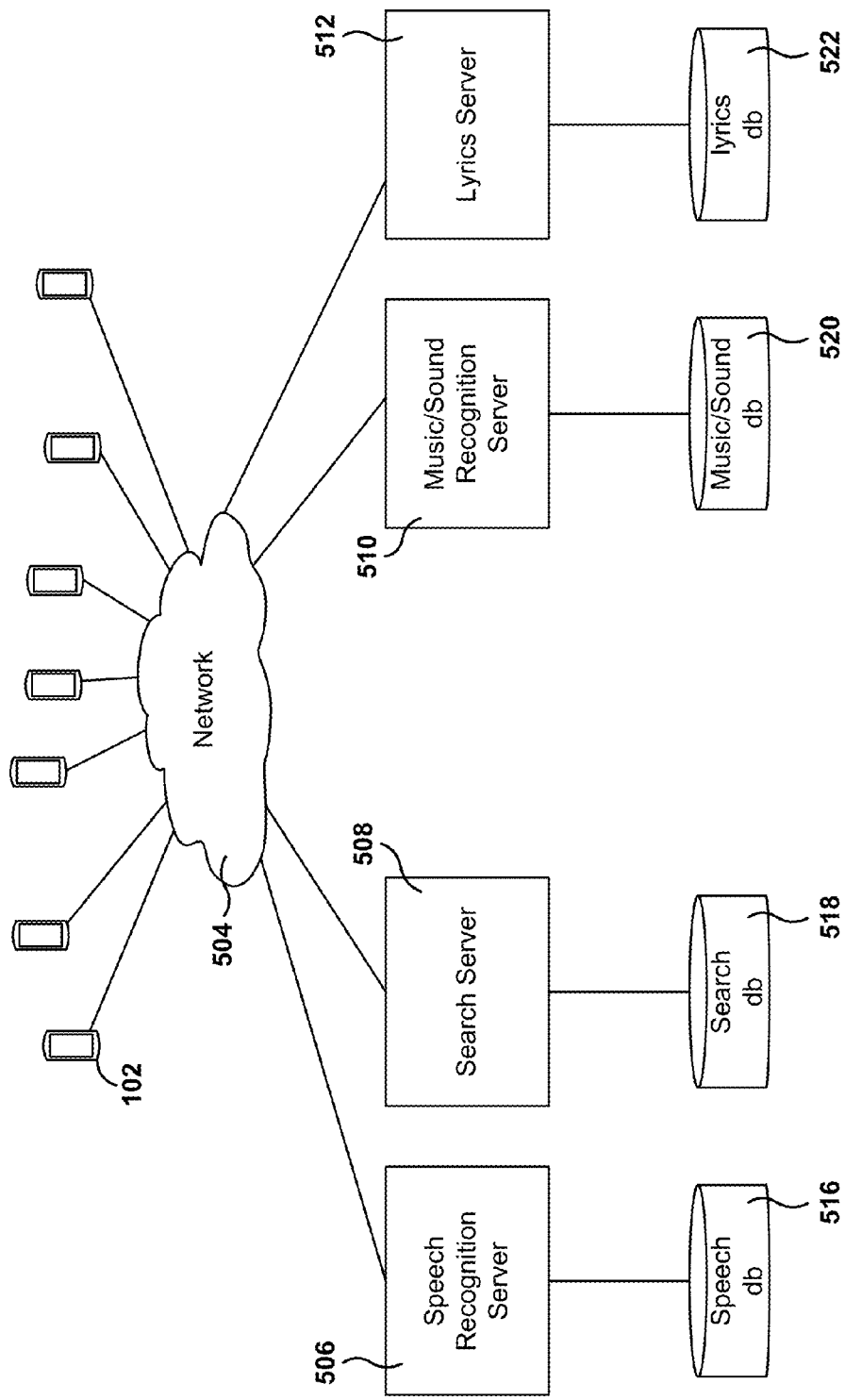
FIG. 5 illustrates a sample architecture for audio recognition, according to some embodiments.

FIG. 5 illustrates a sample architecture for audio recognition, according to some embodiments. A plurality of users with computing devices 102 access a plurality of servers through network 504. In several implementations, the servers include a speech recognition server 506, a search server 508, a music/sound recognition server 510, and a lyrics server 512.

These servers may be distributed over a plurality of distributed servers, or the functionality of several servers may be combined into a single server. The servers are coupled to a plurality of respective databases, which include speech database 516, search database 518, music/sound database 520, and lyrics database 522. In some embodiments, the databases may also be accessed directly by any of the servers in FIG. 5.

The speech recognition server 506 provides speech recognition services: it receives audio segments from portable devices 102, analyzes the audio segments, and determines the speech associated with the received audio segments. The speech database 516 includes information regarding speech and speech analysis, such as text pronunciation, word patterns, sentence patterns, common queries, grammatical rules, semantic rules, etc.

The search server 508 performs web searches for users, and search database 518 includes search information, such as websites, titles, abstracts, most common websites, etc. In one embodiment, after the speech recognition server determines the textual content of detected speech, the search server performs a search on the textual content. In one embodiment, the speech recognition server communicates directly with the search server to perform the search. In another embodiment, the portable device sends the service request to the search server after the portable device receives the textual content of the speech from the speech recognition server 506.

The music and sound recognition server 510 provides services for the recognition of music, as well as other well-known audio segments, such as movie soundtracks, TV shows soundtracks, etc. Music/sound database 520 stores music related information, such as songs fingerprints and song information, which may include song title, artist, album, date of release, pictures of album covers, song timing information (e.g., timestamps), indexing into the lyrics database 522, etc.

The music and sound recognition server 510 has to identify song matches quickly in order to make a determination of whether the audio received by the portable device 102 is speech or music. The music and sound recognition server 510 starts index lookups against the music and sound database 520 as soon as snippets of sound are received from the client. Further, the music and sound recognition server 510 continues performing additional searches into the database, as additional snippets of sound are received from the client.

The client 102 captures the audio and streams the audio (e.g., snippets of sound) to the speech recognition server 506 and to the music and sound recognition server 510 simultaneously. Simultaneously means that the client sends audio segments to the servers at about the same time, without having to obtain the results from one server before starting operations with the other server. In other words, at least part of the music recognition is performed while the speech recognition is being performed, and at least part of the speech recognition is performed while the music recognition is being performed. The operations for speech recognition and music recognition overlap for at least a certain period of time. In some embodiments, the audio segments sent to the servers are the same and are sent at the same time, but in other embodiments the audio segments may have different lengths, processed in different ways (e.g. compressed), and be sent at different times. However, the processes for detecting speech or music are executed in parallel in order to make a fast determination of what type of audio is being received by client 102. In another embodiment, the client interfaces with one of the servers, which in turn interfaces with other servers as needed, so the client only needs to send data to only one server.

The music and sound recognition server 510 processes the received audio and generates fingerprints based on some or all the audio received. Then the fingerprints are used to access the music and sound database 520 in order to detect a match. The song identification process is an incremental process because as more sound is received, more fingerprints are calculated and more searches are done in the music and sound database 520. Based on the results of these searches, eventually the set of possible results are narrowed to just one song or a few songs. If the results are narrowed down to one song, this song will be the most likely match. If the results are narrowed down to a few songs, the most likely song will be selected as the match.

The lyrics server 512 provides lyrics for songs. The lyrics database 522 includes the lyrics for songs or other audio tracks, as recited above. The lyrics information may also include the timing of the lyrics, so the lyrics may be displayed together with a music track.

The speech recognition server 506 and the music and sound recognition server 510 provide confidence scores to the client identifying the probability that the audio captured by the client is text or music.

In some embodiments, fingerprinting requires an exact match to determine that the song has been identified. Therefore, it is unlikely that if a user speaks into the microphone, the captured speech will produce a fingerprint match. On the other hand, if the speech recognition server 506 analyzes a segment of music by running this segment of music through the acoustic model for speech, the results would determine that the music received doesn't sound anything like speech. Therefore, the speech recognition confidence scores are usually low when analyzing music.

It is noted that the embodiments illustrated in FIG. 5 are examples. Other embodiments may utilize different servers, combine several servers into one, distribute the functionality of one server among a plurality of servers, etc. The embodiments illustrated in FIG. 5 should therefore not be interpreted to be exclusive or limiting, but rather illustrative.

Figure 6:
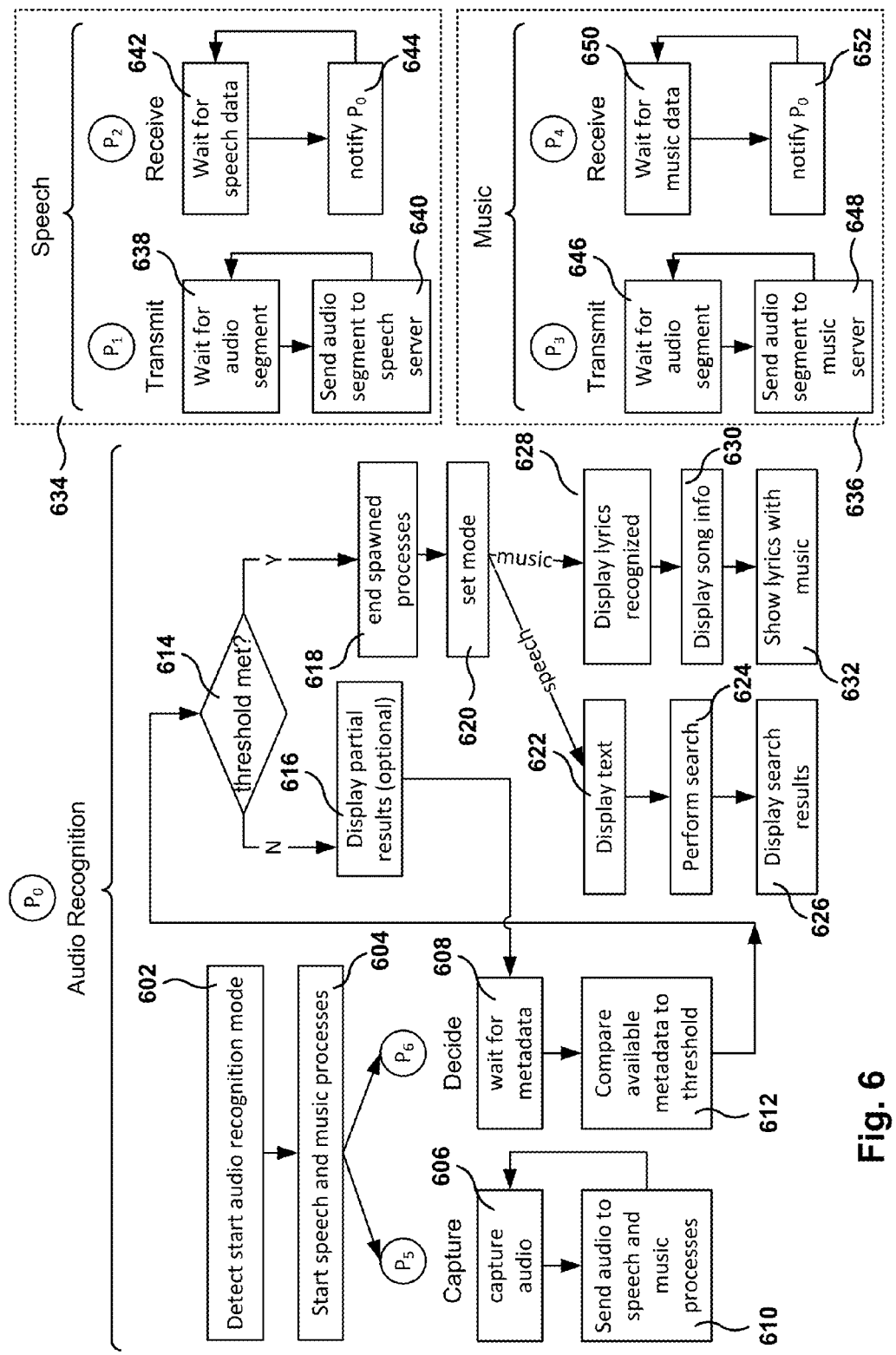
FIG. 6 is a flowchart for analyzing an audio stream, according to some embodiments.

FIG. 6 is a flowchart for analyzing an audio stream, according to some embodiments. While some operations in this flowchart are presented and described sequentially, one of ordinary skill will appreciate that some or all of the operations may be executed in a different order, be combined or omitted, or be executed in parallel.

For description purposes, the process executed to analyze audio in the client device is broken into a plurality of processes that execute in parallel. However, it is understood that some of these processes may be executed within the same process that alternates performing operations described for some of the different processes. In some embodiments, a single process performs all the operations described in FIG. 6.

The client device includes process $P_0$ that, when executed by a processor, performs operations to analyze sound and determine if the received sound is speech or music. In addition, process $P_0$ may perform additional operations after the sound is analyzed, such as performing a search or displaying song lyrics.

In operation 602, the method detects that audio recognition mode has started. In one embodiment, audio recognition mode is started when the user selects an option in the computing device, such as a selecting a button in a graphical interface.

From operation 602, the method flows to operation 604 where the speech and music recognition processes are started: $P_1$, $P_2$, $P_3$, and $P_4$, which are described in more detail below. Processes $P_5$ and $P_6$ are also initiated to capture sound and to determine when a match has been made, respectively. In some embodiments, the captured sound is sent to both speech and music recognition servers. Both servers return respective results with respective confidence scores indicating if the audio received is speech or music.

With regards to process $P_5$, in operation 606 a segment of audio is captured. From operation 606, the method flows to operation 610 where the captured audio is sent to the speech and music processes (described below) that interface with the respective remote servers. As more audio is received, additional audio is sent to the speech and music processes to further refine the process of audio recognition and identification.

With regards to process $P_6$, in operation 608 the method waits for metadata being returned from any of the speech or music recognition servers. The metadata is information about the audio (e.g., text detected or possible songs matches) and confidence scores that provide a probabilistic indication that the audio is speech or music. After the metadata is received, the method flows to operation 612 where the confidence score or scores received with the metadata are analyzed to determine if the threshold of confidence required to make a determination has been reached.

From operation 612, the method flows to operation 614 where a determination is made if the required threshold of confidence has been reached (e.g., the confidence score is higher than the threshold of confidence). Typically, the confidence scores from the speech and music servers will not provide a simultaneous match for both speech and music, given the different characteristics of speech and music. In one embodiment, if both confidence scores are high it is assumed that the captured audio is speech, because speech recognition is a more common operation than music recognition. In another embodiment, if both confidence scores are high, both results are shown to the user.

In general, the confidence scores are initially low when only a small fraction of audio is available. As more audio is available, the confidence scores start improving. For example, after 3 to 5 seconds of audio, it is very likely that one of the confidence scores is above the determination threshold. In some noisy environments, or when the user has a bad network connection, audio recognition may take 5-10 seconds or more.

Returning to operation 614, if the confidence threshold is met the method flows to operation 618, and if the confidence threshold is not met the method flows to operation 616. In operation 616, in some embodiments partial results are displayed, but this is an optional operation, and in some embodiments partial results are not displayed. From operation 616, the method flows back to operation 608 to wait for additional metadata.

In operation 618, process $P_0$ terminates processes $P_1$-$P_6$ since a determination has already been made on the recognition of the captured audio. In some embodiments, messages are sent to the servers indicating that the audio recognition operation has ended. From operation 618, the method flows to operation 620 where the recognition mode is set: speech or music. If the confidence scores determine that the audio corresponds to speech, the method flows to operation 622, and if the confidence scores determine that the audio corresponds to music, the method flows to operation 628. In other words, the highest confidence score for speech or music will determine if the audio corresponds to speech or music.

In operation 622, the recognized text is displayed to the user (e.g., "lyrics of American Anthem" indicating that the user wants to perform a search for the lyrics of the American Anthem, see FIG. 1, interface 124). From operation 622, the method flows to operation 624 where a search is performed utilizing for the search the text identified by the speech server. In one embodiment, the text is sent to a search server and results are received back from the search server. From operation 624, the method flows to operation 626 where the search results are displayed to the user (e.g., see FIG. 1, interface 126).

If it is determined that a song has been identified, the method flows to operation 628 where the lyrics that were recognized during the audio capture sequence are displayed to the user (e.g., see FIG. 2, interface 210). After the captured lyrics are displayed for a predetermined amount of time, the method flows to operation 630 were song information is displayed (e.g., see interface 212 in FIG. 2). In some embodiments, the method flows to operation 632 where ongoing lyrics are displayed in synchronism with the music.

The speech processes 634 $P_1$ and $P_2$ are used for transmitting and receiving information, respectively, to and from the speech server. With regards to process $P_1$ in charge of transmitting information to the server, in operation 638 the method waits for an audio segment to be received from process $P_5$. Once an audio segment is received, the method flows to operation 640 where the audio segment is streamed to the speech server. Process $P_1$ continues waiting for additional segments, and if additional segments are received the additional segments are transferred to the speech server, until process $P_1$ is terminated by process $P_0$.

With regards to process $P_2$ in charge of receiving information from the speech server, in operation 642 the method waits for speech data from the speech server. Once the speech data is received (e.g., text and a speech confidence score), the method flows to operation 644 where process $P_2$ notifies (e.g., transfers the received speech data) to process $P_0$ (see operation 608).

The music recognition processes 636 $P_3$ and $P_4$ perform similar operations to processes $P_1$ and $P_2$, but for music recognition. With regards to process $P_3$, in operation 646 the method waits for an audio segment to be received from process $P_5$. Once audio is received, the method flows to operation 648 where the audio segment is sent to the music recognition server. Process $P_3$ keeps waiting for additional audio segments, and if additional audio segments are received they are sent to the music recognition server, until process $P_3$ is terminated by process $P_0$.

With regards to process $P_4$ in charge of receiving information from the music recognition server, in operation 650 the method waits for music data from the music recognition server. Once the music data is received, the method flows to operation 652 where process $P_4$ notifies (e.g., transfers the received music data) to process $P_0$ (see operation 608).

Figure 7:
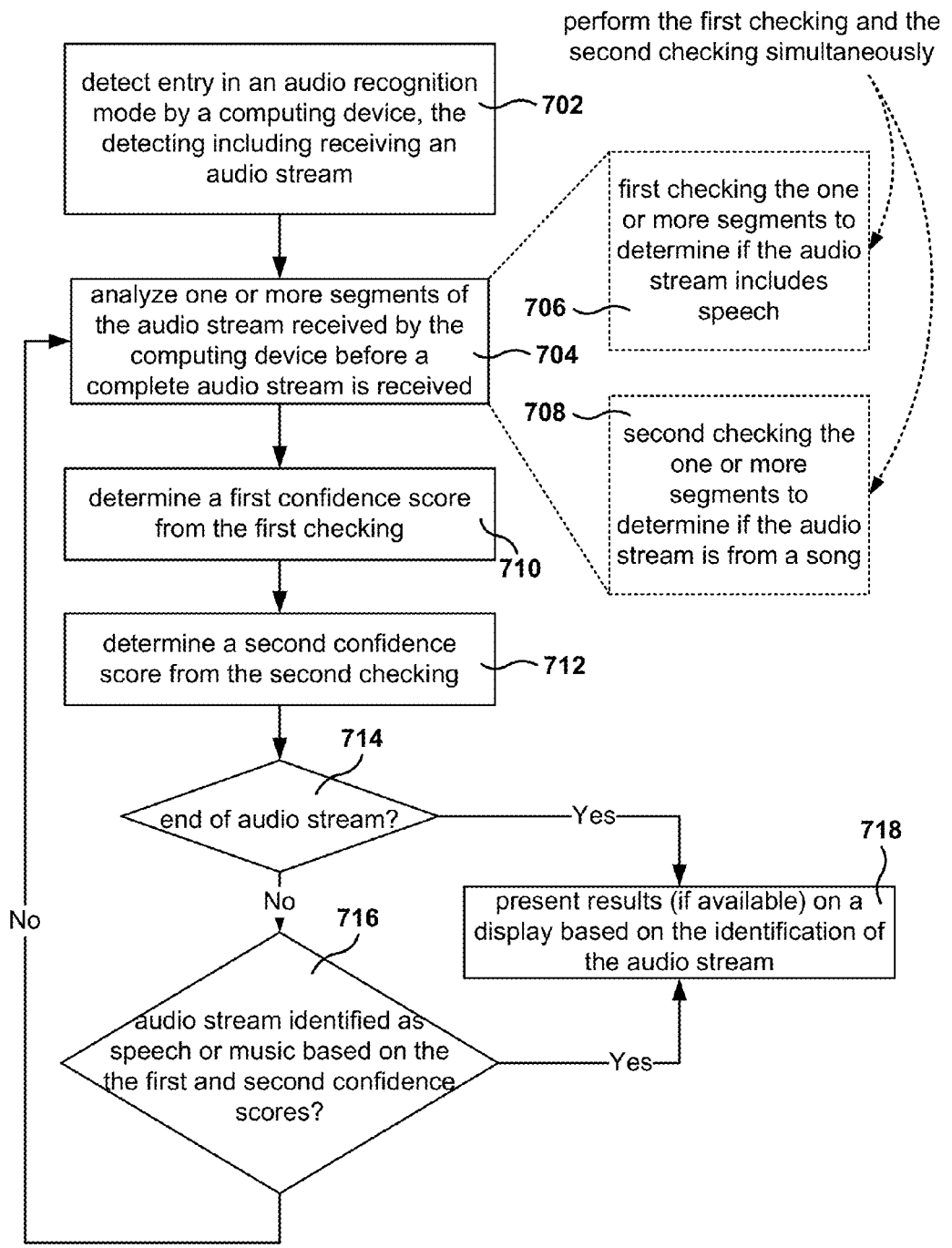
FIG. 7 is a flowchart for simultaneous analysis of speech and music, according to some embodiments.

FIG. 7 is a flowchart for simultaneous analysis of speech and music, according to some embodiments. While the various operations in this flowchart are presented and described sequentially, one of ordinary skill will appreciate that some or all of the operations may be executed in a different order, be combined or omitted, or be executed in parallel.

In operation 702, the method includes an operation for detecting entry in the audio recognition mode by the computing device. An audio stream is received by the computing device for analysis, and the audio stream is used to determine whether the audio corresponds to speech or music. From operation 702, the method flows to operation 704 where one or more segments of the audio stream are analyzed. In one embodiment, the one or more segments are received by the computing device and are analyzed before the complete audio stream is received.

Operation 704 includes two operations that are performed simultaneously, or at least substantially at about the same time: operation 706 and operation 708. In operation 706, a first check is performed of the one or more segments to determine if the audio stream includes speech. In operation 708, a second check is performed to determine if the one or more segments of the audio stream are from a song.

From operation 704, the method flows to operation 710 where the method determines a first confidence score from the first check (i.e., operation 706). From operation 710, the method flows to operation 712 where a second confidence score is determined based on the second check (i.e., operation 708).

From operation 712 the method flows to operation 714, where a check is made to determine if the audio stream has ended (e.g., the user has press the microphone button again or a long period of silence has been detected, etc.). If the audio stream has ended, the method flows to operation 718 and if the audio stream has not ended the method flows to operation 716.

In operation 716, another check is made to determine if the audio stream has been identified as speech or music, based on the first and second confidence scores. If the audio stream has been identified the method flows to operation 718, and if the audio stream has not been identified the method flows to operation 704 to continue analyzing the incoming audio stream.

In operation 718, the results are presented to the user, if available. The results may not be available if the audio stream was too short, in a noisy environment, if a network connection to the servers was lost, etc.

Figure 8:
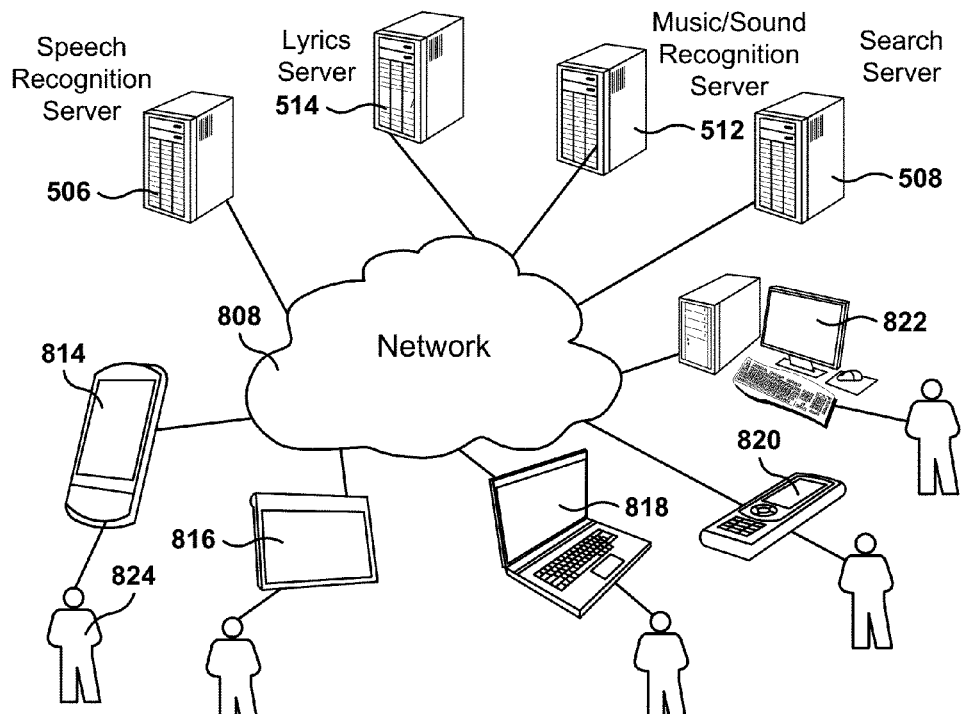
FIG. 8 provides one example architecture of a system that may utilize several implementations described herein.

FIG. 8 provides one example architecture of a system that may utilize several implementations described herein. Users 824 interact with servers and with other users via network 808. The user may access the servers' services through different devices, including a smart phone 814, a tablet computer 816, a laptop 818, a mobile phone 820, a personal computer 822, or any computing device that provides access to the Network 808. Of course, the illustrated devices are only examples.

In several implementations, the audio recognition servers provide audio detection and recognition for the client devices. In some embodiments, the audio recognition servers including a speech recognition server 506, a lyrics server 514, and a music and sound recognition server 512. A search server 508 provides web search capabilities for the client devices.

Other implementations may utilize different servers, have the functionality of one server distributed over a plurality of servers, have the functionality of two or more servers combined into a single server, etc. The implementations illustrated in FIG. 8 should therefore not be interpreted to be exclusive or limiting.

Figure 9:
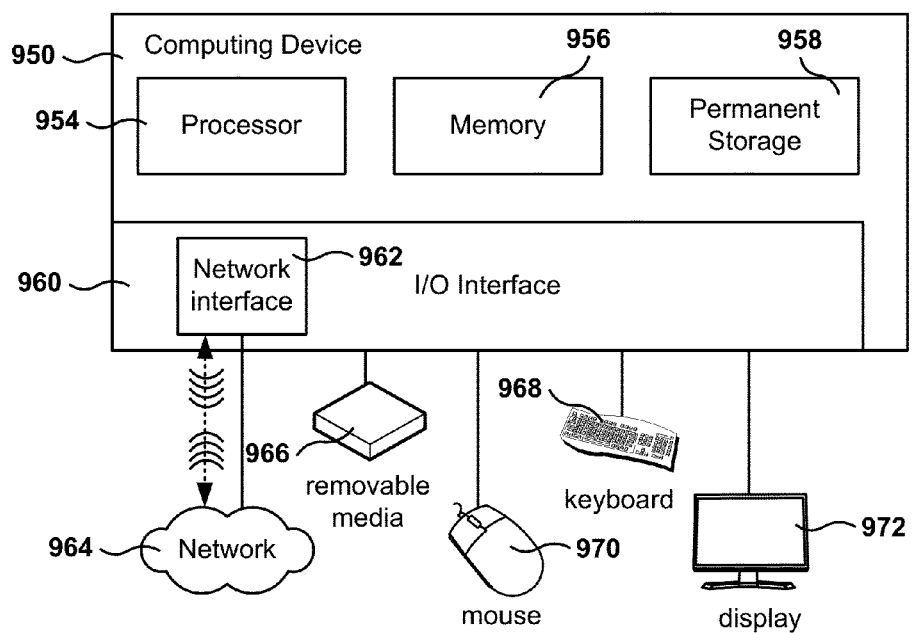
FIG. 9 is a simplified schematic diagram of a computer system for executing implementations described herein.

FIG. 9 is a simplified schematic diagram of a computer system for executing implementations described herein. It should be appreciated that the methods described herein may be performed with a digital processing system (e.g., a conventional, general-purpose computer system). Special purpose computers, which are designed or programmed to perform only one function, may be used in the alternative. The computing device 950 includes a processor 954, which is coupled through a bus to memory 956, permanent storage 958, and Input/Output (I/O) interface 960.

Permanent storage 958 represents a persistent data storage device like a hard drive or a USB drive, which may be local or remote. Network interface 962 provides connections via network 964, allowing messaging (wired or wireless) with other devices. It should be appreciated that processor 954 may be embodied in a general-purpose processor, a special purpose processor, or a specially programmed logic device. Input/Output (I/O) interface 960 provides messaging with different peripherals and is connected with processor 954, memory 956, and permanent storage 958, through the bus. Sample peripherals include display 972, keyboard 968, mouse 970, removable media device 966, etc.

Display 972 is defined to display the user interfaces described herein. Keyboard 968, mouse 970, removable media device 966, and other peripherals are coupled to I/O interface 960 in order to exchange information with processor 954. It should be appreciated that data to and from external devices may be transferred through I/O interface 960. Several implementations can also be practiced in distributed computing environments where tasks are performed by remote processing devices that are linked through a wired or a wireless network.

Implementations can be fabricated as computer readable code on a non-transitory computer readable storage medium. The non-transitory computer readable storage medium holds data which can be read by a computer system. Examples of the non-transitory computer readable storage medium include permanent storage 958, network attached storage (NAS), read-only memory or random-access memory in memory module 956, Compact Discs (CD), Blu-ray™ discs, flash drives, hard drives, magnetic tapes, and other data storage devices. The non-transitory computer readable storage medium may be distributed over a network-coupled computer system so that the computer readable code is stored and executed in a distributed fashion.

Some, or all operations of the method presented herein are executed through a processor (e.g., processor 954 of FIG. 9). Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Several implementations presented herein recite a device or apparatus. The apparatus may be specially constructed for the required purpose or may be a general purpose computer. The apparatus includes a processor capable of executing the program instructions of the computer programs presented herein.

Although the foregoing implementations have been described with a certain level of detail for purposes of clarity, it is noted that certain changes and modifications can be practiced within the scope of the appended claims. Accordingly, the provided implementations are to be considered illustrative and not restrictive, not limited by the details presented herein, and may be modified within the scope and equivalents of the appended claims.

What is claimed is:

1. A method for providing information to a user, the method comprising:
    detecting entry in an audio recognition mode by a computing device, the detecting including receiving an audio stream;
    analyzing, by a processor of the computing device, one or more segments of the audio stream received by the computing device before a complete audio stream is received, wherein analyzing includes:
        first checking the one or more segments to determine if the audio stream includes speech; and
        second checking the one or more segments to determine if the audio stream is from a song, wherein at least part of the first checking is performed while the second checking is being performed;
        determining a first confidence score from the first checking and determining a second confidence score from the second checking;
        displaying a possible candidate on a display based on a partial identification of the audio stream using the first and second confidence scores while continuing checking additional segments as the audio stream is received until an end of the audio stream or until the first and second confidence scores determine that the audio stream has been identified as speech or music; and
        presenting results on the display based on the completed identification of the audio stream.

2. The method as recited in claim 1, wherein first checking further includes sending the one or more segments to a speech recognition server, and wherein second checking further includes sending the one or more segments to a music recognition server.

3. The method as recited in claim 1, wherein determining the first confidence score further includes receiving the first confidence score from a speech recognition server, and wherein determining the second confidence score further includes receiving the second confidence score from a music recognition server.

4. The method as recited in claim 1, further including:
    presenting intermediate results, on the display, while the audio stream is being received based on one or more first confidence scores and one or more second confidence scores, the intermediate results including one or more possible results.

5. The method as recited in claim 4, wherein the audio stream is identified as speech, wherein the intermediate results include recognized words received in the audio stream.

6. The method as recited in claim 4, wherein the audio stream is identified as music, wherein the intermediate results include candidate result songs for the audio stream.

7. The method as recited in claim 1, further including:
    after the detecting the entry in the audio recognition mode, providing, on the display, a unified interface for recognizing speech and music; and
    providing an indicator in the unified interface on the display that the audio stream is being received.

8. The method as recited in claim 1, further including:
    performing, by the computing device, a search when the audio stream has been identified as speech, the search being performed on the identified speech.

9. The method as recited in claim 1, further including:
    displaying song information on the display when the audio stream has been identified as music, the song information corresponding to an identified song.

10. The method as recited in claim 9, further including:
    displaying, on the display, lyrics in synchronism with the identified song.

11. A device for providing information to a user, the device comprising:
    a microphone;
    a display;
    a processor; and
    a memory including a computer program for audio recognition, wherein instructions of the computer program when executed by the processor perform operations for:
        detecting entry in an audio recognition mode, the detecting including receiving an audio stream via the microphone;
        analyzing one or more segments of the audio stream before a complete audio stream is received, wherein analyzing includes:
            sending the one or more segments to a first server for determining if the audio stream includes speech; and
            sending the one or more segments to a second server for determining if the audio stream is from a song;
            receiving a first confidence score from the first server and receiving a second confidence score from the second server;
        displaying a possible candidate on the display based on a partial identification of the audio stream using the first and second confidence scores while continuing analyzing additional segments as the audio stream is received until an end of the audio stream or until the first and second confidence scores determine that the audio stream has been identified as speech or music; and
        presenting results on the display based on the completed identification of the audio stream.

12. The device as recited in claim 11, wherein the device is one of a phone, a tablet, a personal computer, a book reader, or a laptop.

13. The device as recited in claim 11, wherein sending the one or more segments to a first server and sending the one or more segments to a second server are performed in parallel and independently from each other.

14. The device as recited in claim 11, wherein the processor further performs operations of:
    providing a unified interface in the display for recognizing speech and music; and
    providing an indicator in the unified interface that the audio stream is being received.

15. The device as recited in claim 11, wherein the processor further performs an operation for presenting intermediate results while the audio stream is being received based on one or more first confidence scores and one or more second confidence scores.

16. A computer program embedded in a non-transitory computer-readable storage medium, when executed by one or more processors, for providing information to a user, the computer program comprising:

program instructions for detecting entry in an audio recognition mode by a computing device, the detecting including receiving an audio stream;
program instructions for analyzing one or more segments of the audio stream received by the computing device before a complete audio stream is received, wherein analyzing includes:
first checking the one or more segments to determine if the audio stream includes speech; and
second checking the one or more segments to determine if the audio stream is from a song, wherein at least part of the first checking is performed while the second checking is being performed;
program instructions for determining a first confidence score from the first checking and determining a second confidence score from the second checking;
program instructions for displaying a possible candidate on a display based on a partial identification of the audio stream using the first and second confidence scores while continuing checking additional segments as the audio stream is received until an end of the audio stream or until the first and second confidence scores determine that the audio stream has been identified as speech or music; and
program instructions for presenting results on a display based on the completed identification of the audio stream.

17. The computer program as recited in claim 16, further including:
program instructions for compressing the one or more segments to produce a compressed audio segment to be sent to one or more servers for audio recognition.

18. The computer program as recited in claim 16, wherein first checking further includes sending the one or more segments to a speech recognition server, and wherein second checking further includes sending the one or more segments to a music recognition server.

19. The computer program as recited in claim 16, further including:
program instructions for comparing the first confidence score against a first threshold; and
program instructions for determining that the audio segment is speech when the first confidence score is higher than the first threshold.

20. The computer program as recited in claim 16, further including:
program instructions for comparing the second confidence score against a second threshold; and
program instructions for determining that the audio segment is music when the second confidence score is higher than the second threshold.

* * * * *